US005280645A

United States Patent [19]

Nguyen et al.

[11] Patent Number: 5,280,645

[45] Date of Patent: Jan. 18, 1994

[54] ADJUSTABLE WRISTBAND LOOP ANTENNA

[75] Inventors: Tuan K. Nguyen, Boca Raton; Annette D. Horn; Robert A. Marinelli, both of Boynton Beach, all of Fla.

[73] Assignee: Motorola, Inc., Schaumburg, Ill.

[21] Appl. No.: 705,675

[22] Filed: May 24, 1991

[51] Int. Cl.[5] .......... H04B 1/16; H04B 1/08; H01Q 1/24

[52] U.S. Cl. .......... 455/274; 455/351; 343/718

[58] Field of Search .......... 455/89, 90, 274, 280, 455/281, 283, 290, 272, 344, 345, 347, 348, 350, 351, 193.2; 368/205, 10; 340/825.44, 825.47; 343/702, 718, 720; H01Q 7/00, 1/440, 1/240

[56] References Cited

U.S. PATENT DOCUMENTS

| | | | |
|---|---|---|---|
| 3,946,397 | 3/1976 | Irwin | 343/788 |
| 4,754,285 | 6/1988 | Robitaaile | 343/718 |
| 4,769,656 | 9/1988 | Dickey | 455/351 |
| 4,817,196 | 3/1989 | Macnak et al. | 455/193 |
| 4,862,516 | 8/1989 | Macnak et al. | 343/718 |
| 4,873,527 | 10/1989 | Tan | 343/718 |
| 4,920,353 | 4/1990 | Mori et al. | 343/718 |
| 4,922,260 | 5/1990 | Gaskill et al. | 455/351 |
| 4,977,614 | 12/1990 | Kurcbart | 455/193 |
| 5,007,105 | 4/1991 | Kudoh et al. | 343/718 |
| 5,072,231 | 12/1991 | Koyama | 343/718 |
| 5,128,686 | 7/1992 | Tan et al. | 343/718 |

FOREIGN PATENT DOCUMENTS

| | | | |
|---|---|---|---|
| 0100639A2 | 2/1984 | European Pat. Off. . | |
| 2-65502 | 3/1990 | Japan | H01Q 1/240 |
| 3-88404(A) | 4/1991 | Japan | H01Q 7/00 |
| 8700463 | 9/1988 | Netherlands | H01Q 1/440 |

*Primary Examiner*—Reinhard J. Eisenzopf
*Assistant Examiner*—Lisa Charouel
*Attorney, Agent, or Firm*—Philip P. Macnak; Thomas G. Berry; Daniel R. Collopy

[57] ABSTRACT

A wristworn receiving device suitable for being worn about a wrist comprises a receiver (404) for receiving radio frequency signals on a particular operating frequency, a housing (142) for enclosing the receiver (404), a first wristband section (102) including a first wristband loop antenna portion (118) and a movable clasp member (122), and a second wristband section (104) including a second wristband loop antenna portion (134) terminated in a fixed clasp member (140). The first (118) and second (134) wristband loop antenna portions are partially resonated at the operating frequency. The second wristband loop antenna portion (134) is coupled to the first wristband loop antenna portion (118) and is positioned by the movable clasp member (122) at first (204) and second (202 or 206) positions along the first wristband loop antenna portion (118) so as to form a resonant loop antenna which remains substantially tuned to the operating frequency at the first (204) and second (202 or 206) positions.

10 Claims, 4 Drawing Sheets

ADJUSTABLE WRISTBAND LOOP ANTENNA

BACKGROUND OF THE INVENTION

1. Field of the Invention

The present invention relates to the field of loop antennas, and more particularly to adjustable wristband loop antennas for wristworn receiving devices.

2. Description of the Prior Art

Recent advances in miniaturization of receiver components have made possible the development of wristworn receiving devices, such as wristworn pagers. Various antenna configurations have been developed using loop antennas which have been located within the wristband of the wristworn receiving device. Examples of such wristband antennas are as follows. U.S. Pat. No. 4,754,285 issued to Robitaille and U.S. Pat. No. 4,769,656 issued to Dickey illustrate loop antennas suitable for use in expansion type wristbands. U.S. Pat. No. 4,713,808 issued to Gaskill illustrates a basic wristband loop antenna configuration, which presumably requires retuning for different wrist sizes. U.S. Pat. No. 4,922,260 issued to Gaskill illustrates a wristband loop antenna which presumably must be cut to adjust the length and the corresponding resonance of the antenna to fit the wearer's wrist. U.S. Pat. No. 4,977,614 issued to Kurcbart illustrates an apparatus for adjusting the length of a single segment loop antenna while automatically compensating for the antenna tuning. And U.S. Pat. No. 4,873,527 issued to Tan illustrates a combination ferrite loop and wristband loop antenna arrangement. Such antennas, as described above, are generally suitable for use only at lower operating frequencies, such as below approximately 170 Megahertz. As the operating frequency is increased, such loop antennas can become more difficult to tune, become more directional, and become more difficult to provide an impedance match to the RF amplifier. There is a need to provide a wristband loop antenna structure which is capable of overcoming the deficiencies described above for operating at frequencies in excess of 170 Megahertz.

SUMMARY OF THE INVENTION

A wristworn receiving device suitable for being worn about a wrist comprises a receiver for receiving radio frequency signals on a particular operating frequency, a housing for enclosing the receiver, a first wristband section coupled to the housing and including a first wristband loop antenna portion having a first end coupled to the receiver and a second end coupled to a movable clasp member, and a second wristband section coupled to the housing and including a second wristband loop antenna portion having a first end coupled to the receiver and a second end coupled to a fixed clasp member. The first and second wristband loop antenna portions include capacitive and inductive elements which partially resonate the first and second wristband loop antenna portions at the operating frequency. The second end of the second wristband loop antenna portion is coupled to the second end of the first wristband loop antenna portion and is positioned by the movable clasp member at first and second positions along the second end of the first wristband loop antenna portion so as to form a resonant loop antenna which remains substantially tuned to the operating frequency at the first and second positions.

DESCRIPTION OF THE PREFERRED EMBODIMENTS

Figure 1A:
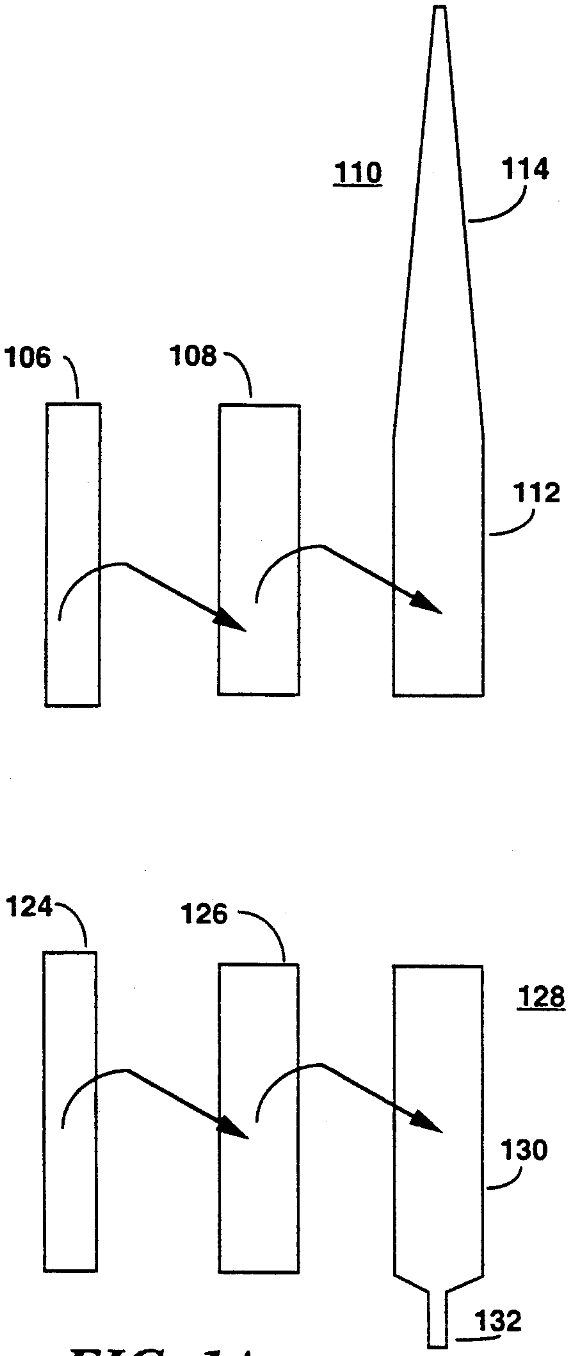
FIGS. 1A, 1B, and 1C are pictorial diagrams illustrating the construction of the wristband loop antenna in accordance with the present invention.
Figure 1B:
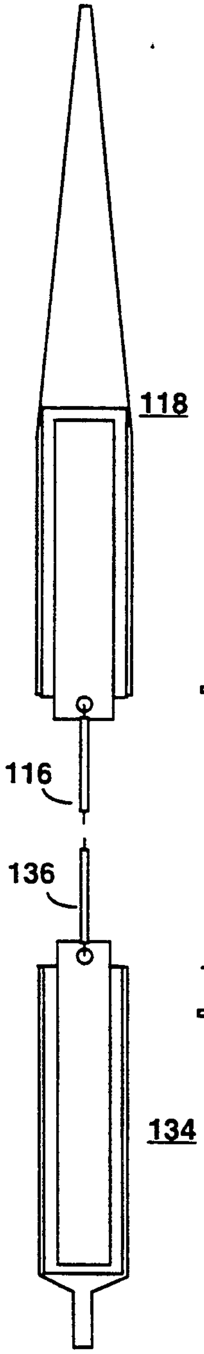
Figure 1C:
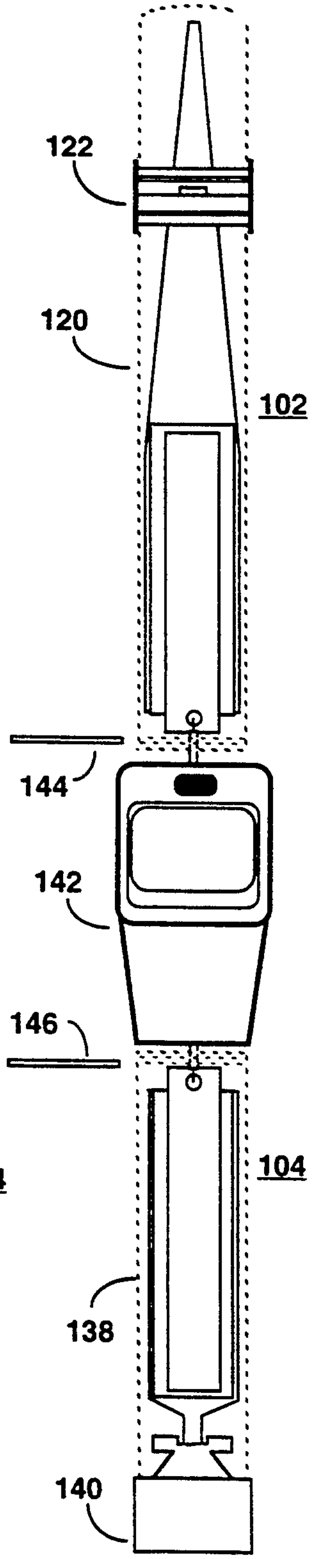

FIGS. 1A, 1B and 1C are pictorial diagrams illustrating the construction of the wristband loop antenna in accordance with the present invention. As shown in FIGS. 1A and 1C, the wristband loop antenna comprises two antenna segments constructed as wristband sections 102 and 104. The wristband section 102 comprises a first conducting element 106, an insulating element 108, and a second conducting element 110. In particular, the first conducting element 106 is formed as a generally rectangular sheet from a five mil thick (five thousandths of an inch thick) copper-clad KAPTON TM polyimide film, or other suitable dielectric material. The cladding is preferably two ounce copper laminated to the polyimide film. The insulating element 108 is formed as a generally rectangular sheet from a five mil thick non-clad KAPTON TM polyimide film, or other suitable dielectric material, which is somewhat wider in width and somewhat shorter in length than the first conducting element 106. The second conducting element 110 is formed having a first portion 112 which is generally rectangular, and a second portion 114, contiguous to the first portion 112, which is symmetrically tapered about the midline of the second conducting element 110, the function of which will be described in detail below. The second conducting element 110 is formed from a five mil thick copper-clad KAPTON TM polyimide film, or other suitable dielectric material, having a width somewhat wider than the insulating element 108. The insulating element 108 is positioned and adhesively attached using a pressure sensitive adhesive film to the polyimide film surface of the second conducting element 110. The first conducting element 106 is then positioned with the polyimide film surface facing the insulating element 108 and adhesively attached using a pressure sensitive adhesive film, or other suitable material, to the insulating element 108 thereby forming, as shown in FIG. 1B, the first antenna segment 118 having two conducting surfaces and approximately a fifteen mil thick insulator spaced therebetween. An insulated conductor 116, such as insulated, stranded wire, is then soldered to the conductor surface of the first conducting element 106 to provide electrical connection between the first antenna segment 118 and a receiver located within a housing which may include, among other things, paging decoding circuitry, watch circuitry, and an LCD display for displaying the time and any received messages. The first antenna segment 118 is then molded into a strap 120, using a silicon rubber material, such as BAYSILONE TM LSR2070 manufactured by Mobay Chemical Company or PELETHANE TM manufactured by Dow Chemical Company, or other suitable material.

Returning to FIGS. 1A and 1C, the wristband section 104 comprises a first conducting element 124, an insulating element 126, and a second conducting element 128. In particular, the first conducting element 124 is formed as a generally rectangular sheet from a five mil thick copper-clad KAPTON TM polyimide film, or other suitable dielectric material. The cladding is preferably two ounce copper laminated to the polyimide film. The insulating element 126 is formed as a generally rectangular sheet from a five mil thick non-clad KAPTON TM polyimide film, or other suitable dielectric material, which is somewhat wider in width and somewhat shorter in length than the first conducting element 124. The second conducting element 128 is formed having a first portion 130 which is generally rectangular, and a second portion 132, or tab portion contiguous to the first portion 130, which is symmetrical about the midline of the second conducting element 128. The second conducting element 128 is formed from three mil thick beryllium-copper sheet metal, or other suitable material such as quarter or half hard copper, having a width somewhat wider than the insulating element 126. When a sheet metal other than copper is utilized, the sheet metal should be suitably plated, such as with a tin or gold over nickel over copper plating, to improve the RF conductivity of the sheet metal and to prevent oxidation and improve solderability when required. The insulating element 126 is positioned and adhesively attached using a pressure sensitive adhesive film, or other suitable material, to the second conducting element 128. The first conducting element 124 is then positioned with the polyimide film surface facing the insulating element 126 and adhesively attached using a pressure sensitive adhesive film to the insulating element 126 thereby forming, as shown in FIG. 1B, the second antenna segment 134. An insulated conductor 136 is then soldered to the conductor surface of the first conducting element 124 to provide electrical connection between the second antenna segment 134 and a receiver. A clasp 140 is also soldered or attached by other suitable means, such as spot welding, to the tab portion 132 of the second conducting element 128. The second antenna segment 134 is then molded into a strap 138, as described above.

The first antenna segment 118 and the second antenna segment 134 can also be formed into a wristband using materials suitable for laminating, or also enclosed in other suitable nonconductive materials, such as leather. Also, while specifically described as using a copper-clad KAPTON TM polyimide film for the first conducting elements 106, 124 in the first and second antenna segments 118, 134, and the second conducting element 110 in the first antenna segment 118, it will be appreciated that a sheet metal such as copper, or beryllium-copper can be utilized as well with a corresponding adjustment in the thickness of the insulating elements 108, 126 to compensate for the loss of dielectric thickness due to the removal of the polyimide film. As described above, when a sheet metal other than copper is utilized, the metal should be suitably plated.

Returning to FIG. 1A, the first wristband section 102 is mechanically attached to the device housing 142 using a roll pin 144 with the second conducting element 110 positioned closest to the wrist. A roll pin 146 is also used to mechanically attach the second wristband section 104 to the housing 142 with the second conducting element 128 positioned closest to the wrist. Electrical connection is provided by the insulated conductors 116 and 136, as described above. A slider assembly 122, which can be moveably positioned along the length of the wristband section 102, together with the clasp 140, provides, in one embodiment, an adjustment means providing adjustment of the wristband size in a number of predetermined sized steps is provided, and in a second embodiment the adjustment means provides for the substantially continuous variability in the adjustment of the wristband size when the wristworn device is worn on the wrist. When the wristband segments are implemented as per the first embodiment, the slider assembly 122 is preferably provided with a dimple which is used to engage a plurality of blind holes positioned at regular intervals along the midline on the surface of strap 120, thereby providing for wristband size adjustments in the predetermined steps. When the wristband segments are implemented as per the second embodiment, the dimple on the slider assembly 122 is preferably omitted, thereby providing for wristband size adjustments in a continuously variable manner.

Figures 2A, 2B, 2C:
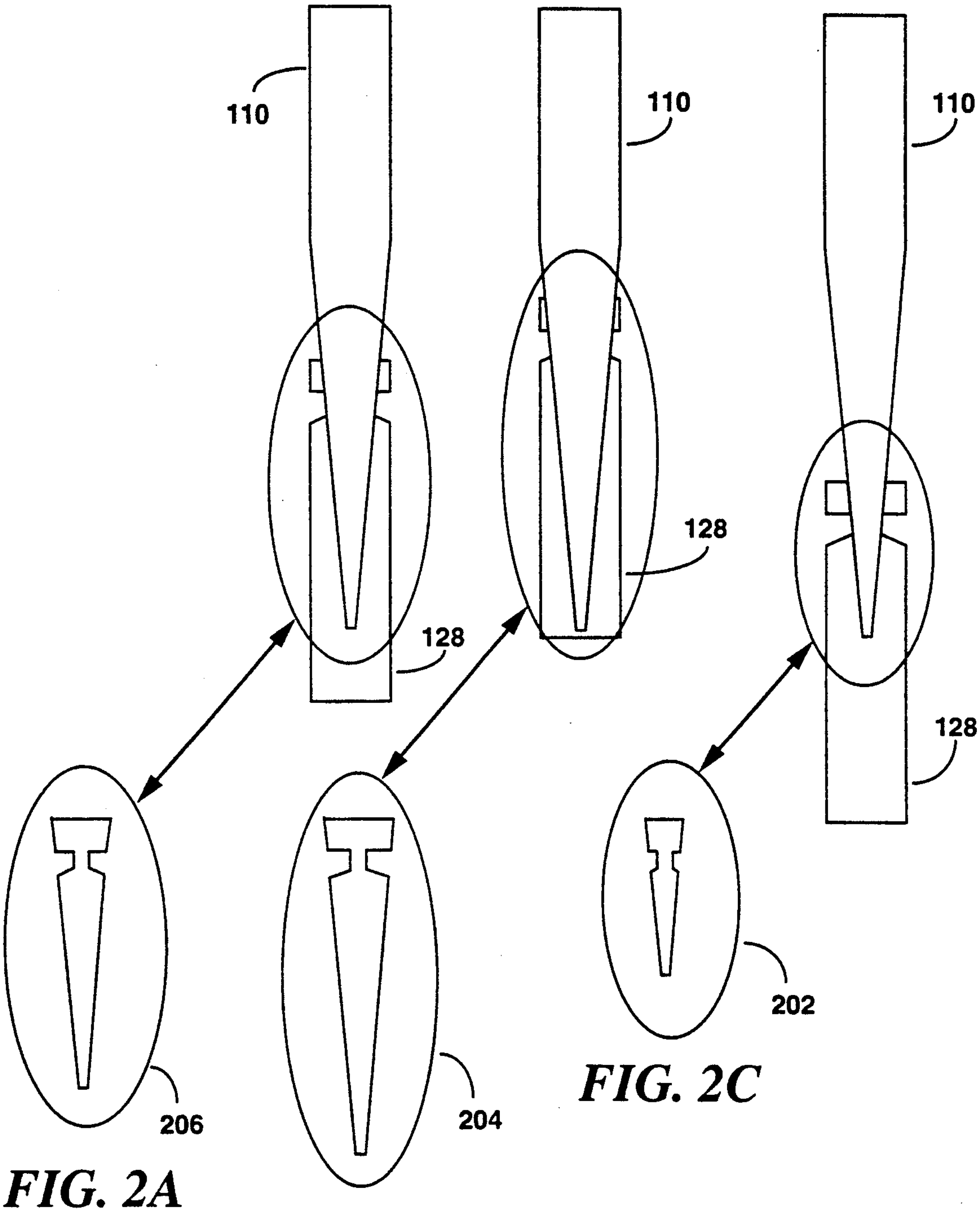
FIGS. 2A, 2B and 2C are pictorial diagram illustrating the tuning arrangement of the wristband loop antenna in accordance with the present invention.

FIGS. 2A, 2B and 2C are pictorial diagrams illustrating the tuning arrangement of the wristband loop antenna in accordance with the present invention. As shown in FIGS. 2A, 2B and 2C, the tuning of the wristband loop antenna in accordance with the present invention is controlled by the amount of overlap of the first wristband section 102 and the section wristband section 104. In particular, as shown in FIG. 2, the antenna tuning is controlled by the overlap of the second conducting element 110 in the first wristband section 102 being proximally positioned between the second conducting element 128 of the second wristband section 104 and the wrist. When the wristworn device is placed on a large wrist, as shown in FIG. 2C, a minimum overlap 202 occurs between second conducting element 110 and the second conducting element 128. When the wristworn device is placed on a small wrist, as shown in FIG. 2B, a maximum overlap 204 occurs between second conducting element 110 and the second conducting element 128. And when the wristworn device is placed on an average wrist, as shown in FIG. 2A, a medium, or nominal wrist, overlap 206 occurs between second conducting element 110 and the second conducting element 128. The amount of overlap of the second conducting element 110 and the second conducting element 128 generates a variable capacitance, as will be described further below, which enables adaptive tuning of the wristband loop antenna. The tapered shape of the second portion 114 of the second conducting element 110 enables continuously tuning the loop antenna over the variation in wrist sizes while maintaining substantially constant antenna tuning. It will be appreciated that other conductor geometries, such as a conductor which is tapered from one edge to the other may be utilized as well to achieve substantially constant antenna tuning. It will be appreciated that the actual range of variation in the overlap being provided is a function of the relative wrist sizes for the group of individuals for which the wrist worn device is intended. Thus a wristband antenna intended for women may have a smaller variation and overall size than that intended for men.

FIG. 3 is a pictorial diagram illustrating the electrical components associated with the wristband loop antenna in accordance with the present invention. As shown in FIG. 3A, the insulated conductor 116 (not shown) and the first conducting element 106 represents a fixed value inductor L1 having an inductance value related to the geometry of the conductors at the particular operating frequency of the receiver. The overlapped metal areas comprising first conducting element 106, insulating element 108 and the first portion of the second conducting element 110 provide a fixed value capacitor C1 having a capacitance value related to the geometry of the overlap of first conducting element 106 and second conducting element 110. The length of the second conducting element 110 represents a fixed value inductor L2 having an inductance value related to the geometry of the conductor segment. That part of the first conducting element 106 which is not overlapped by the second wristband section represents a variable value inductor LV having an inductance value related to the geometry of the non-overlapped conductor segment and is the residual inductance remaining within the overall loop which was not partially resonated by capacitors C1, CV, and C2. The overlapped metal areas comprising the second portion of the first conducting element 114, the wristband cover material, and the first portion of the second conducting element 130 represent a variable value capacitor CV having a capacitance value related to the geometry of the overlap of the second portion of the first conducting element 114 and the second portion of the second conducting element 130. The length of the second conducting element 128 represents a fixed value inductor L3 having an inductance value related to the geometry of the conductor segment. And the insulated conductor 136 (not shown) and the second conducting element 128 represents a fixed value inductor L4 having an inductance value related to the geometry of the conductors at the particular operating frequency. It will be appreciated from the description provided above, the various capacitor and inductor components of the wristband loop antenna are defined in terms of lumped component elements, and other electrical models, such as using distributed component structures could be utilized to define the antenna operation as well.

Figure 3A:
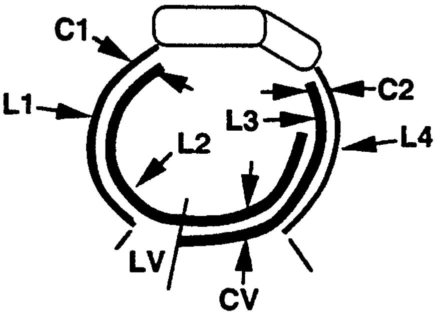
FIGS. 3*a*–3*d* is a pictorial diagram illustrating the electrical components associated with the wristband loop antenna in accordance with the present invention.
Figure 3B:
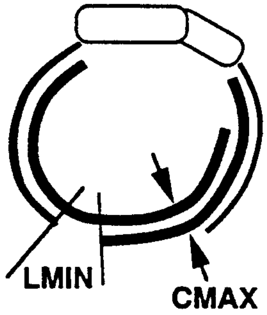
Figure 3C:
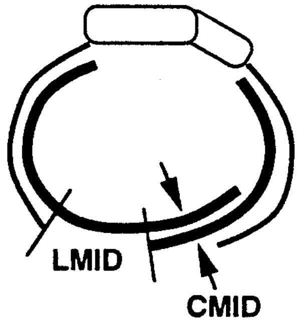
Figure 3D:
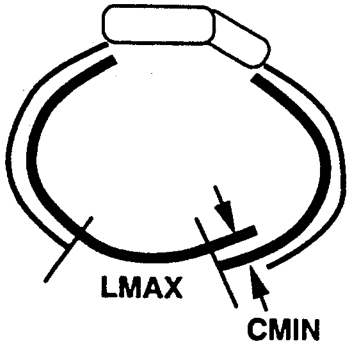

As shown in FIG. 3B, at maximum overlap of the first and second wristband sections, the variable inductor value LVMIN is a relatively small inductance and can be substantially zero for the inductor LV as described above, while the variable capacitor value CMAX is a maximum capacitance value due to the maximum overlap of wristband section areas. As shown in FIG. 3C, when the overlap of the first and second wristband sections is at the median or midpoint, the variable inductor value LMID is at a median inductance value and corresponds to the added length of the second portion of the second conducting element 110 which is no longer overlapping the second wristband section, while the variable capacitor value CMID is at a median capacitance value corresponding to the geometry of the overlapped wristband section areas. And as shown in FIG. 3D, when the overlap of the first and second wristband sections is at the minimum, the variable inductor value LMAX is at a maximum inductance value and corresponds to the added length of the second portion of the second conducting element 110 which is no longer overlapping the second wristband section, while the variable capacitor value CMIN is at a minimum capacitance value corresponding to the geometry of the remaining overlapped wristband section areas.

In summary, the amount of overlap of the first antenna segment 118 in the first wristband section 102 and the second antenna segment 134 in the second wristband section 104 controls the value of the variable capacitance and inductance presented in the antenna circuit for tuning. As the amount of overlap is increased such as when placed on a smaller wrist, the variable capacitance value is increased while the variable inductance value is decreased, and as the amount of overlap is decreased, such as when placed on a larger wrist, the variable capacitance value is decreased while the variable inductance value is increased, resulting in a net constant impedance value being maintained within the antenna circuit, thereby maintaining a substantially constant tuning of the antenna. Because the first antenna segment 110 is overlapped by the second antenna segment 134 when the receiving device is being worn on the wrist, only a minimum amount of variability in the tuning of the antenna is encountered due to a minimization of the variations in the spacing between the first and second antenna segments 110, 128 and the relative insensitivity of the capacitor value CV to change due to the relatively thick dielectric presented between the first and second wristband sections. It will be appreciated the wristband clamping can be changed to overlap the second wristband section over the first wristband section as well, provided the wristband sections are constantly held in close proximity position.

Figure 4:
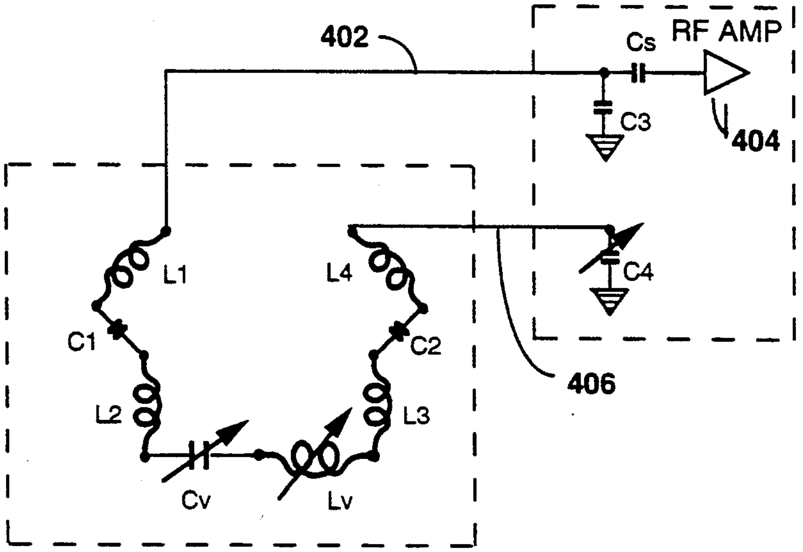
FIG. 4 is an electrical schematic diagram of the wristband loop antenna in accordance with the present invention.

FIG. 4 is an electrical schematic diagram of the wristband loop antenna in accordance with the present invention. The wristband loop antenna comprises a fixed value inductor L1, a fixed value capacitor C1, a fixed value inductor L2, a variable value capacitor CV, a variable value inductor LV, a fixed value inductor L3, a fixed value capacitor C2 and a fixed value inductor L4, all of which are connected in series. One output 402 of the wristband loop antenna is coupled to the receiver, and in particular, is coupled to one terminal of a fixed value capacitor C3, and one terminal of a fixed value capacitor CS. The other terminal of capacitor C3 is coupled to ground, while the other terminal of capacitor CS is coupled to the input of the RF amplifier 404. Fixed capacitors C3 and CS are used to match the wristband loop antenna into the RF amplifier in a manner well known in the art. The second output 406 of the wristband loop antenna is coupled to a first terminal of a variable capacitor C4. The second terminal of the variable capacitor C4 is coupled to ground. Variable capacitor C4 is used to tune the wristband loop antenna to the particular operating frequency. In the preferred embodiment of the present invention, the wristband loop antenna is tuned with the first and second antenna segments overlapped to approximately the median capacitance value for variable capacitor CV, when the wristworn device is placed on a substantially circular fixture which approximates the conductivity of the human wrist. In this manner, once the antenna has been tuned, variations in tuning encountered between the minimum wrist size and the maximum wrist size are substantially minimized.

It will be appreciated from the description provided above, the tuning of the wristband loop antenna constructed in accordance with the present invention is a function of a number of variables which are dependent upon the actual frequency of operation. The actual variation of the wristband size between a small wrist and a large wrist and the choice of wristband material and thickness determines the variation in capacitor value CV and the inductor value LV to tune the antenna. The actual plate sizes and dielectric thicknesses for capacitors C1 and C2, which are formed as described above, are functions of the operating frequency, the dielectric material utilized and the overall relative inductance of the basic loop antenna structure at the operating frequency. The value for C1 and C2 are selected to resonate the first and second wristband loop antenna segments at a predetermined resonant frequency which will be below the lowest operating frequency, thereby reducing the overall loop inductance. By proper selection of C1 and C2 capacitor values, a variable capacitor C4 having a range, such as on the order of from 1-10 picofarads, will enable tuning the wristband loop antenna over a relatively wide frequency range, such as from 270-290 MHz, while maintaining substantially constant antenna tuning over the complete range of wrist sizes. It will be appreciated that actual capacitor and inductor values are a function of the actual operating frequency and the required match to the RF amplifier, and may be larger or smaller than that described above.

FIG. 5 is a pictorial diagram illustrating some typical test positions utilized in characterizing the wristband loop antenna in accordance with the present invention. It will be appreciated that other test positions may be utilized as well to characterize other aspects of the performance of the antenna when the wristworn device is worn on the wrist, depending upon the degree of characterization which may be deemed necessary. Five typical test positions are shown. FIG. 5A corresponds to a position where the wearer of the wristworn device is facing the transmitting antenna, and has the arm positioned in front of the body, as shown. FIG. 5B corresponds to a position where the wearer of the wristworn device is facing the transmitting antenna, and has the arm positioned by the side of the body, as shown. FIG. 5C corresponds to a position where the wearer of the wristworn device is rotated ninety degrees relative to the transmitting antenna, and has the arm positioned to the side of the body facing the transmitting antenna, as shown. FIG. 5D corresponds to a position where the wearer of the wristworn device is facing the transmitting antenna, and has the arm positioned as if resting "on a table" with the arm pointed toward the transmitting antenna, as shown. And FIG. 5E corresponds to a position where the wearer of the wristworn device is facing the transmitting antenna and has the arm positioned straight out from the body at shoulder height, as shown. TABLE I below provides some typical performance data for a wristworn device operated at a frequency of approximately 280 MHz.

TABLE I

| POSITION | FIG. A | FIG. B | FIG. C | FIG. D | FIG. E |
|---|---|---|---|---|---|
| RELATIVE SENSITIVITY | 11 dB μV/M | 17 dB μV/M | 16.6 dB μV/M | 19 dB μV/M | 11 dB μV/M |
| COMPARATIVE SENSITIVITY | 0 dB | −6 dB | −5.5 dB | −8 dB | 0 dB |

Figure 5A:
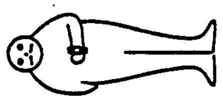
FIGS. 5*a*–5*e* is a pictorial diagram illustrating the positions utilized in characterizing the wristband loop antenna in accordance with the present invention.
Figure 5B:
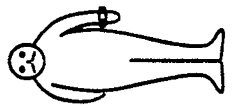
Figure 5C:
Figure 5D:
Figure 5E:
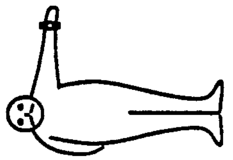

As can be observed from TABLE I, the wristworn loop antenna constructed in accordance with the present invention provides not only substantial H-field, or magnetic field, performance as indicated by the performance data for FIG. 5A, but also exhibits substantial E-field, or electric field, performance as indicated by the performance data for FIGS. 5B-5E. As demonstrated, a worst case null of approximately 6 dB (decibels)(B & C) to 8 dB (D) is obtained when the wrist worn device is positioned as shown in FIG. 5D, as compared to an expected null of on the order of 20-25 dB for a conventional loop antenna at the same operating frequency.

In summary, the wristband loop antenna constructed in accordance wıth the present invention provides improved antenna sensitivity as compared to a conventional loop antenna, while enabling the ability to continuously adjust the size of the wristband about the wrist. The reduction in worst case nulls is due to improved E-field performance which is created by symmetrically positioning conducting elements 106 and 124. The E-field performance is enhanced by varying the aspect ratio as of the width of first conducting elements 106 and 124 compared to the second conducting elements 110 and 128. As the width of the first conducting elements 106 and 124 approach the width of second conducting elements 110 and 128, the E-field performance is reduced, and conversely, as the width of the first conducting elements 106 and 124 are reduced compared to the width of second conducting elements 110 and 128, the E-field performance is enhanced. E-field performance is further enhanced as the frequency of operation is increased. While the description of the wristband loop antenna provided above demonstrates a significant improvement in the antenna efficiency at operating frequencies of 280 Megahertz, it will be appreciated that the antenna configuration disclosed can also provide improved antenna efficiencies at operating frequencies well below and well above the operating frequency indicated, and provide considerable antenna efficiency improvement over prior art wristband loop antennas which were usually limited to operating frequencies generally below 170 Megahertz.

We claim:

1. A wristworn receiving device capable of being worn about a wrist, comprising:

a receiver for receiving radio frequency signals on a particular operating requency;

a housing for enclosing said receiver;

a first wristband section, coupled to said housing and including a first wristband loop antenna portion having a first end coupled to said receiver and a second end coupled to a movable clasp member;

a second wristband section, coupled to said housing and including a second wristband loop antenna portion having a first end coupled to said receiver and a second end coupled to a fixed clasp member, said first and second wristband loop antenna portions including capacitive and inductive elements which partially resonate said first and second wristband loop antenna portions at the operating frequency, and said second end of said second wristband loop antenna portion being coupled to said second end of said first wristband loop antenna portion and being positioned by said movable clasp member at first and second positions along said second end of said first wristband loop antenna portion so as to form a resonant loop antenna which remains substantially tuned to the operating frequency at said first and second positions.

2. The wristworn receiving device according to claim 1 wherein said second wristband section overlaps said first wristband section when securing said housing about the wrist.

3. The wristworn receiving device according to claim 2 wherein said second end of said first wristband loop antenna portion is capacitively coupled to said second end of said second wristband loop antenna portion at said first and second positions.

4. The wristworn receiving device according to claim 3 wherein the magnitude of said capacitively coupled wristband loop antenna portions is a function of the degree of overlap of said second end of said first wristband section and said second end of said second wristband section.

5. The wristworn receiving device according to claim 4 wherein said second end of said first wristband loop antenna portion is tapered.

6. The wristworn receiving device according to claim 1, wherein said movable clasp member and said fixed clasp member selectively couple said first and second wristband sections between said first and second positions for securing said housing about the wrist.

7. The wristworn receiving device according to claim 6, wherein said movable clasp member is continuously positionable between said first and second positions for conforming the wristband size to the wrist.

8. The wristworn receiving device according to claim 6, wherein said movable clasp member is positionable in predetermined steps between said first and second positions for conforming the wristband size to the wrist.

9. The wristworn receiving device according to claim 5 wherein said first and second wristband sections have upper and lower surfaces, and wherein said lower surface of said second wristband section overlaps said upper surface of said first wristband section when said first and second wristband sections are overlapped.

10. The wristworn receiving device according to claim 1 wherein said first wristband loop antenna portion and said second wristband loop antenna portion are further responsive to the electric field of an imposed electromagnetic wave for generating the received signal in response thereto.

* * * * *